Aug. 15, 1933.   W. P. WOOLLEY   1,922,339
SUSPENSION SPRING DEVICE
Filed April 16, 1931

INVENTOR.
William Prentiss Woolley
BY F. Lewis Peyton
ATTORNEYS.

Patented Aug. 15, 1933

1,922,339

UNITED STATES PATENT OFFICE 1,922,339

SUSPENSION SPRING DEVICE

William Prentiss Woolley, Jackson, Miss.

Application April 16, 1931. Serial No. 530,468

4 Claims. (Cl. 267—19)

This invention relates to improved construction in suspension springs, with particular reference to a means for supporting the wheels of an automobile in flexible relation to stationary axles.

The invention has particular reference to the proper suspension of a wheel with relation to its stationary support.

One object of the invention is to provide a device of the character described, which will remove shock and vibration between the point of force and the machine to which the device is attached.

Another object of the invention is to provide a device of the character described, and to reduce the necessary unsprung weight of the supported object.

Another object of the invention is to provide a device of the character described which will obviate the necessity of an axle for supporting rigidity.

Another object of the invention is to provide a device of the character described with such inherent rigidity of construction that the supporting object attached at one point remains in constant relationship to a supported object at another point.

Another object of the invention is to provide a device of the character described which has full accessability for manual attention.

Still another object of the invention is to provide a device of the character described in which the spindle is in stationary relationship to the position of the spring.

Other objects of the invention comprise adjustable means in accordance with the desire of the user, and further wherein the construction is simple but sturdy, easily and quickly adjusted, and thoroughly adequate for its purpose.

To the attainment of the foregoing the improvement also resides in other details of construction, combination and operative association of parts, one satisfactory embodiment of which is shown in the accompanying drawing.

Figure 1:
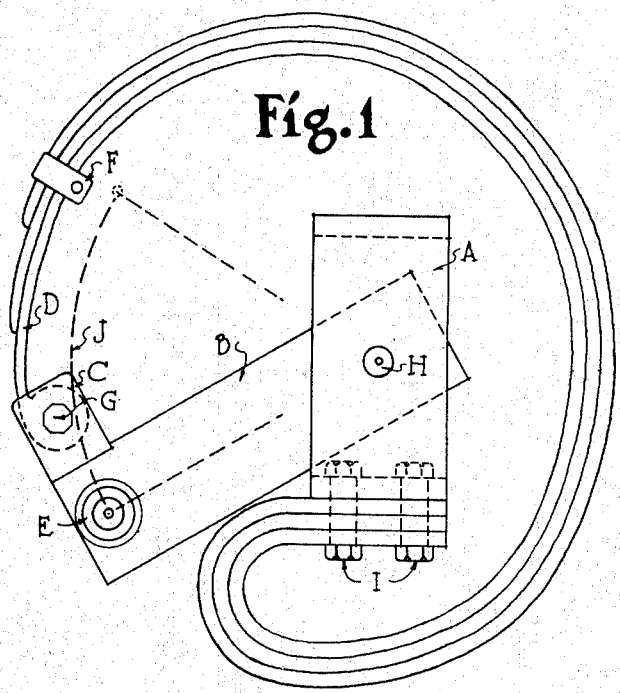
Figure 1 is a vertical view of the device.
Figure 2:
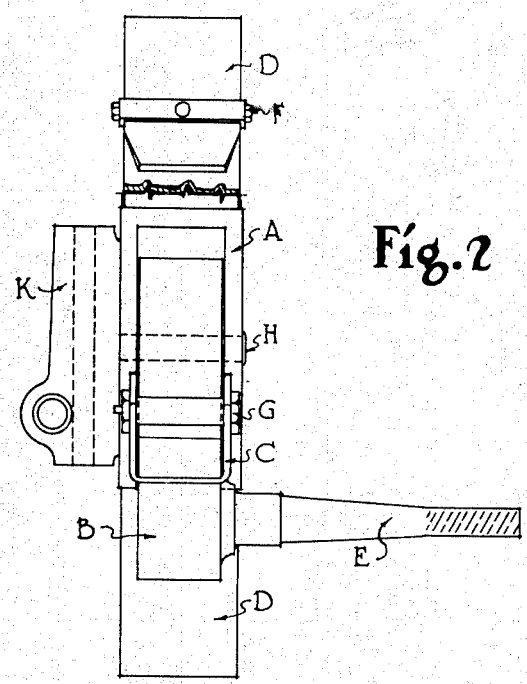
Figure 2 is a front view of the device, a portion of the spring being broken away to better disclose the central elements.

Following the drawing in detail, the letter A designates a supporting link. A link B is pivoted at H with the supporting link A. A spring D is attached by bolts I to the link A, as shown in Figure 1; and the opposite extremity of the spring D from its attachment at I, is tied by a shackle C to the link B, by means of a bolt G. The spring D is preferably comprised of several leaves bolted together at I and held at their opposite extremity by the clip F. At the end of the link B from the pivot H is attached a spindle E. K is a pivotal connection between the link A and the supporting element.

The axle of the supporting element, such as an automobile carries the supporting element K in a pivotal relationship, as the axle of an automobile ordinarily carries the spindle to which is attached the automobile wheel. The spindle E, as shown, carries the wheel in the usual manner. However, it can be seen, that the spindle could be reversed in position to the supporting element K, if this be preferable.

It is therefore seen that force, or weight of the automobile applied to the spindle E moves the link B to a horizontal position, which forces the spring D to expand. When the wheel of the automobile meets an obstruction, there is produced a greater expansion of the spring D, but the tensity of the spring D will force the link B back to its horizontal position. Likewise, it is apparent, a depression in the path of the wheel will cause the spring to force the wheel down to the depth of the depression and back to its horizontal position. The dotted line J shows the path of the spindle E when in motion. It is apparent that the link B, being hinged respectively at H and G, can travel only in one horizontal area.

The construction, operation and advantages of my invention will, it is believed, be understood and appreciated by those skilled in the art when the foregoing description has been read in connection with the accompanying drawing. The degree of adjustment of the several members in relation to each other is such as to take care of any requirements; and while I have here shown and described and pointed out certain novel features of my invention, it is to be understood that various omissions, substitutions and changes in the form and detail of the device and its means of use may be made by those skilled in the art, and that I do not wish to be restricted to the precise structure disclosed, but hold myself entitled to make such changes therefrom as fairly fall within the scope of what I claim.

What I claim is:

1. In a device of the character described a circular spring member the lower end thereof being in a "goose-neck" shape and bolted to a carrying member, and a link pivoted on the carrying member and extending to and in attachment with the opposite end of the spring member, substantially as described.

2. In a device of the character described a circular spring the lower end thereof being a "gooseneck" shape and bolted to a supporting link, and pivoted on said link a second link extending to and pivoted with the opposite end of the spring, said second link adapted to support a spindle.

3. In a device of the character described a circular spring member the lower end thereof being a "goose-neck" and bolted to a supporting link, and pivoted to said supporting link a connecting link extending to and hinged to the opposite end of the spring member.

4. In a device of the character described a circular spring member comprised of several leaves, one end of the spring member bolted to a supporting member and a link hinged to the opposite end of the spring member and extending to and pivoted on the supporting member, the supporting member and the link respectively adapted to support a carried and a carrying means, substantially as described.

WILLIAM PRENTISS WOOLLEY.